June 25, 1963  E. F. DYSON  3,095,003
MEASURING AND CONTROL APPARATUS
Filed July 15, 1960  8 Sheets-Sheet 1

June 25, 1963  E. F. DYSON  3,095,003

MEASURING AND CONTROL APPARATUS

Filed July 15, 1960  8 Sheets-Sheet 2

June 25, 1963     E. F. DYSON     3,095,003
MEASURING AND CONTROL APPARATUS
Filed July 15, 1960     8 Sheets-Sheet 5

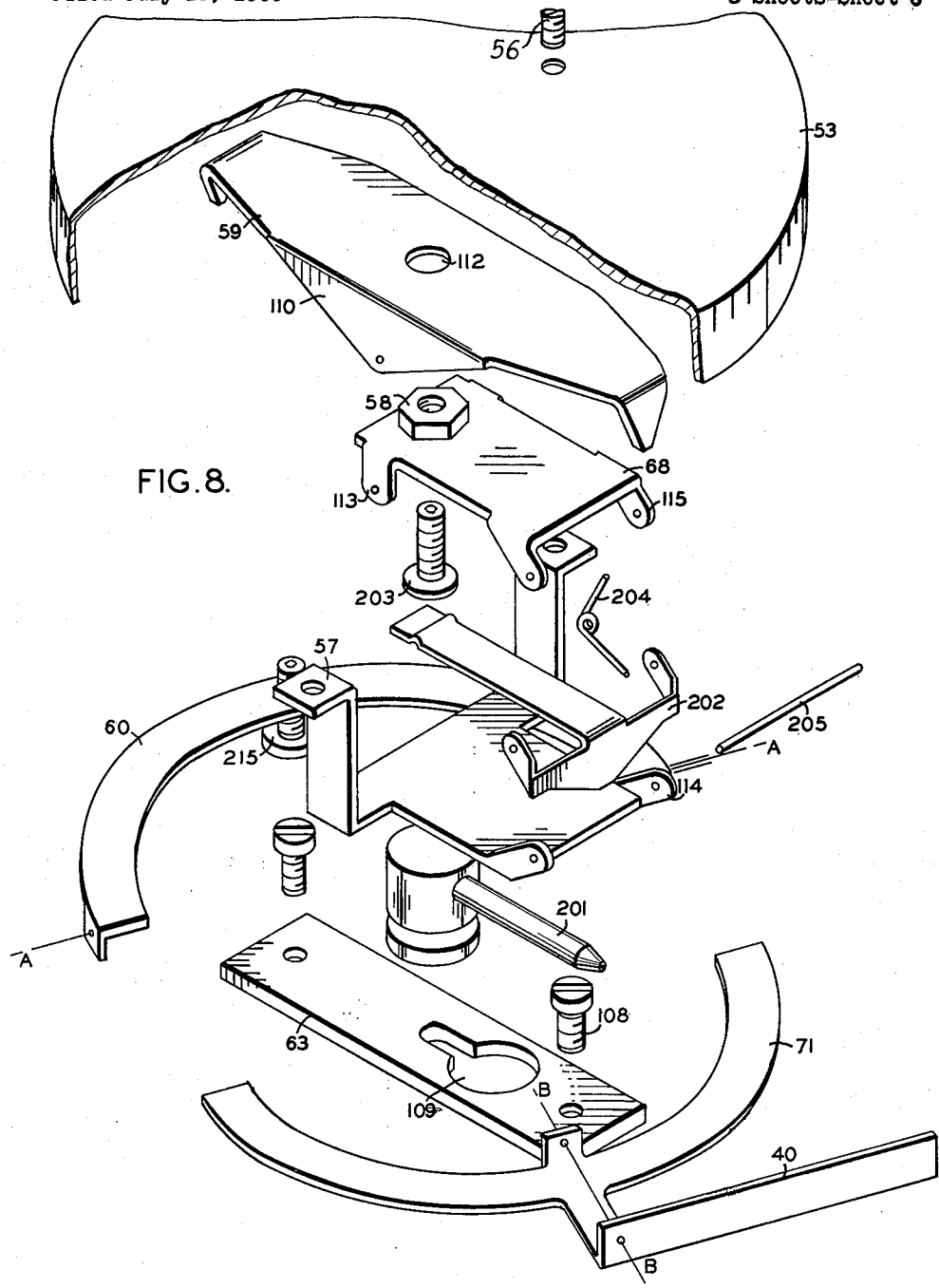

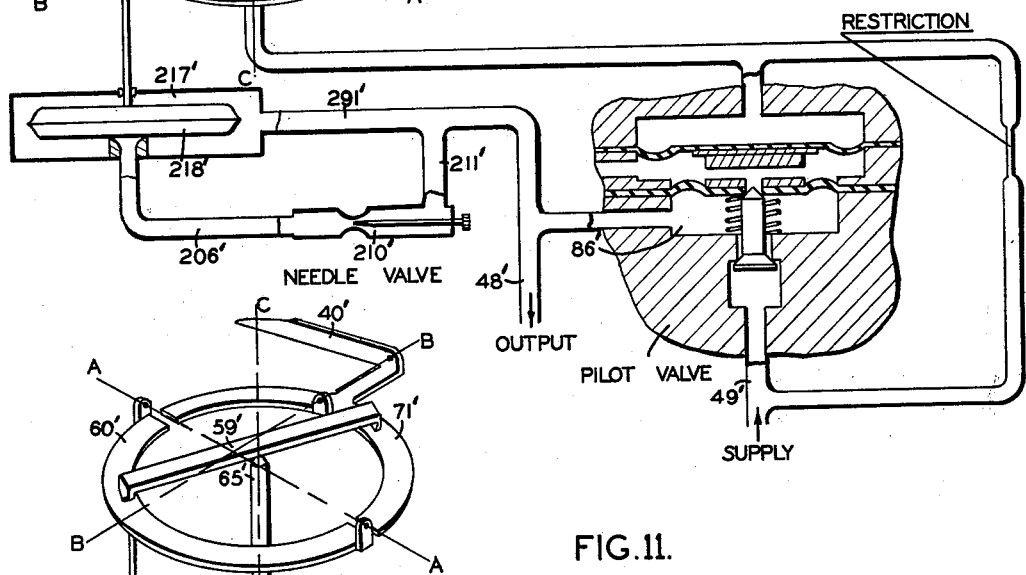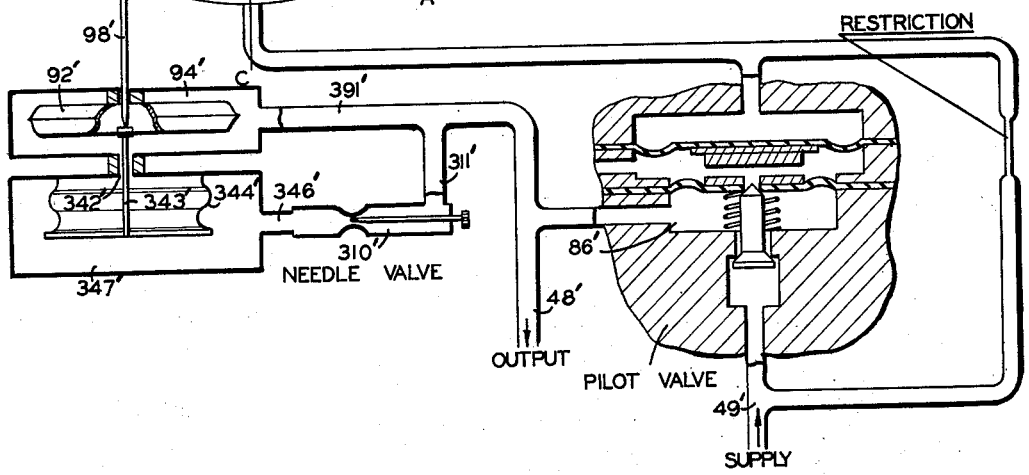

United States Patent Office

3,095,003
Patented June 25, 1963

3,095,003
MEASURING AND CONTROL APPARATUS
Ernest F. Dyson, Cheshire, Conn., assignor to The Bristol Company, Waterbury, Conn., a corporation of Connecticut
Filed July 15, 1960, Ser. No. 43,165
14 Claims. (Cl. 137—86)

This invention relates to measuring instruments and to pneumatically operated control arrangements depending thereupon for use in automatic regulation applicable to a variety of process variables.

The fundamental elements of an automatic process controller of the pneumatic type are, commonly, (a) a deviation sensing mechanism, (b) a nozzle-flapper motion sensing transducer for translation of mechanical motions to fluid pressures, (c) a fluid-operated relay, or pilot valve, for pressure amplification, (d) a feedback mechanism, and (e) a mechanism for setting a predetermined proportional band of a control system. Most controllers are based on proportional action but to these fundamental elements may be added (f) a reset and/or (g) a derivative, or rate, mechanism when higher orders of control action are desired. Inasmuch as proportional control action is essentially a ratio establishing process between input and output, in the present invention the correspondence between proportional action and ratio action will be frequently observed.

Certain improvements in the above component functions and their combination are provided by my invention of which it is the overall object to provide a pneumatic controller of especially simple, compact design of minimum size, readily adjustable for a wide range of process conditions and readily adaptable to the several modes of automatic control operation.

It is a more specific object of the invention to provide a novel linkage mechanism for obtaining a wide range of adjustable values of proportional band and for readily shifting, in the same mechanism, between direct and reverse action.

It is a further object of this invention to provide a ratio controller which combines two input fluid pressures to give an output pressure which is in a predetermined selectable ratio to either of the inputs, the setting of the ratio being accomplishable by either manual or remote means.

It is a still further object to provide a unitary structure comprising the ratio or proportional band mechanism, the pilot valve and the feedback systems in close spatial relation to avoid undesirable capacity effects on control action.

It is another object to provide an elementary controller assembly which is, with simple additions and rearrangements, convertible from proportional control action to proportional plus reset action, or to proportional plus rate, or derivative, action.

It is a further object to provide a novel combination of components to achieve rate, or derivative, control action.

It is another object to provide a proportional controller with a wide range of adjustability in cooperation with a nearly 180° logarithmically graduated scale, being relatively open at low values of proportional band diminishing exponentially for higher values.

It is a still further object to provide a compact controller in which air connections to the ratio, or proportional, mechanism are readily demountable permitting easy assembly and disassembly.

The invention further provides a novel ratio mechanism applicable generally to the control of a variable magnitude through variation of a fluid pressure in accordance with a plurality of other variable magnitudes.

These objects and others will be apparent from the description hereinafter and from the accompanying drawings as follows:

FIGURE 8 is an exploded view of the ratio mechanism showing modifications thereof to adapt the controller to reset action in addition to proportional action;

FIGURE 9 is a schematic diagram illustrative of the operation of the unit as a proportional plus reset action controller;

FIGURE 11 is a schematic diagram illustrating the operation of a control unit to provide proportional-plus-rate, or derivative, action;

Figure 1:
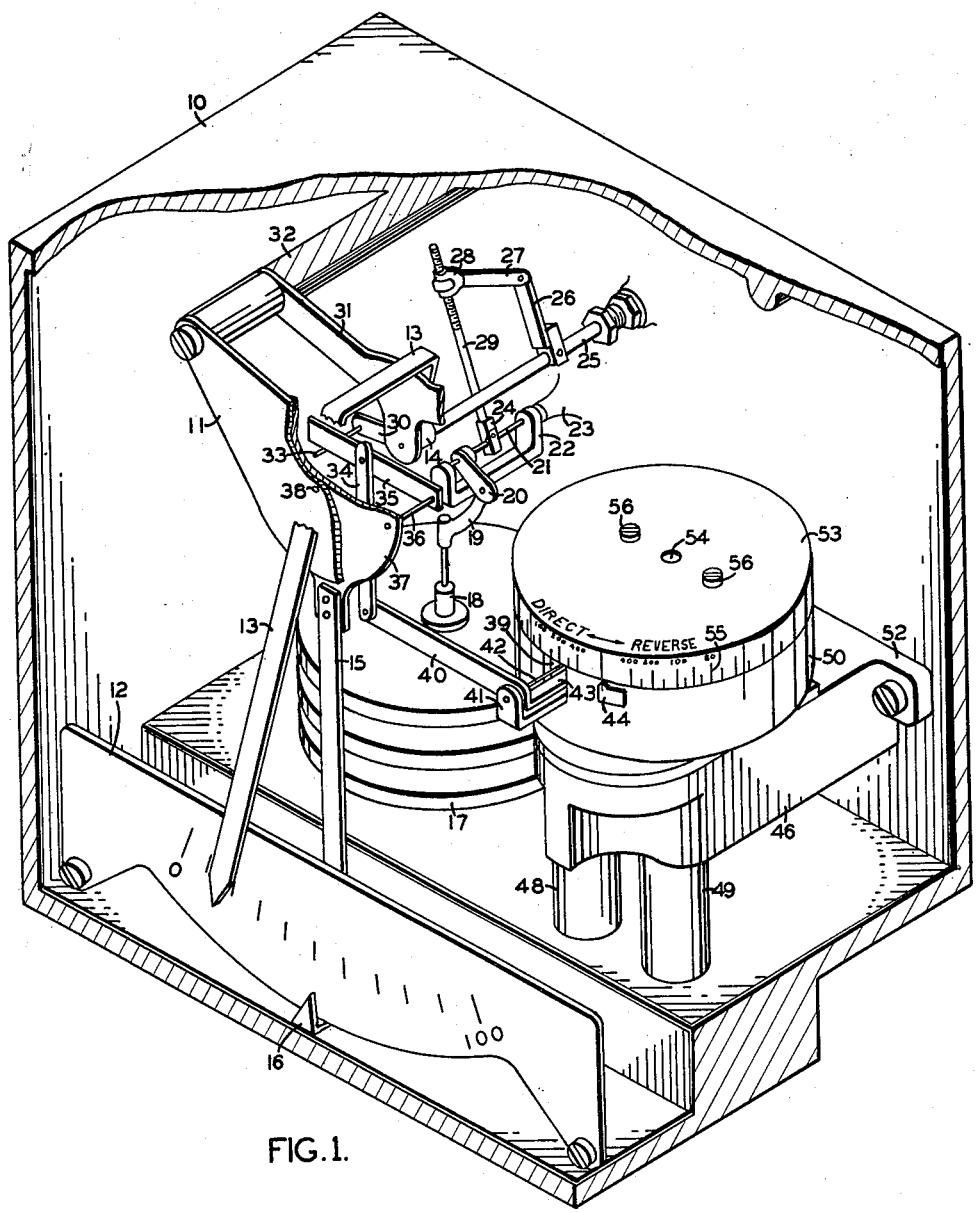
FIGURE 1 is a perspective view of an embodiment of an assembled controller according to my invention, partly broken away to show relationships of internal structure.

Referring now to FIGURE 1, the measuring and control instrument to be described is seen to be housed in a case 10 and includes a scale plate 12 bearing indicia reperesentative of the quantity being measured. The index member 13 at one end is associated with the above-mentioned indicia and at the other end is fixed to a shaft 25 by means of a hub member 14. The linkage structure is supported on mounting plates 11 and 31 carried on pedestals such as shown typically by member 32.

*The Measuring System*

The measuring system as shown illustratively in FIGURE 1 utilizes a form of a capsular pressure element 17 for the primary measuring means. This may be assumed to be connected by piping, not shown, to an external source of the medium whose pressure is to be measured. A motion take-off member 18 is fixed to the movable end of the pressure element and is joined also to an offset member 19 by which the linear displacement of this element is transmitted and transformed into angular motions of lever member 20 and, correspondingly, to rotations of the shaft 21 to which the latter is attached. This shaft is pivoted in a fixed U-frame 22 which is supported in the case by the pedestal 23. A further arm 29 is fixed to shaft 21 by clamp 24 and transmits the movements of the shaft through connecting links 27 and 26 to shaft 25 which has been already referred to above as forming the axis of the indicator arm 13. It may be noted that arm 29 is threaded and the connector fitting 28 attached to link 27 is provided in the form of a nut by which the useful length of arm 29 may be varied and, thus, the relative motions of the two shafts 21 and 25 may be adjusted for calibration purposes, etc.

The Deviation Detector

The deviation in a controller may be defined as the difference between the indicated measurement and a predetermined set point. In FIGURE 1, the setpoint is associated with the indicator scale indicia through the pointer 16 which is actually formed by the lower end of the arm 15. This arm is attached to a disc member 37 which itself is pivotably held by riveting, as at point 38, to mounting plate 11 in frictional rotative engagement therewith at the riveting point. This point is in the same axis as the shaft 25, whereby the arm 13 and the arm 15 move about a common center. At a point near the periphery of the above-mentioned disc 37, a rigid pin 36 extends perpendicularly and makes pivoting engagement with an arm 35 near one extremity thereof. Near its opposite extremity this arm 35 rests on a further pin 33. This latter pin is attached to an arm 30 which is fixed to shaft 25 through hub 14. Arm 35, then, is the connecting element by which the measurement, i.e. the position of the pointer 13, is compared with the set-point, i.e. the position of the pointer 16. Pivoted at a point near the center of arm 35 is a link member 34 at the opposite end of which is rotatably attached the arm 40. Movement of the mechanism is thereby transmitted to the control unit which may now be described.

Proportional or Ratio Mechanism

Figure 4:
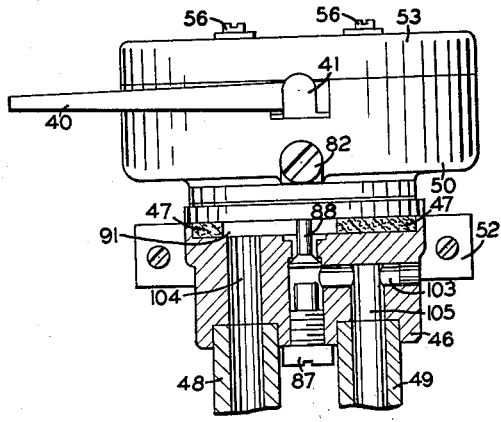
FIGURE 4 is a side elevation of the ratio and pilot valve unit, shown partly in section as indicated by the lines 4—4 in FIGURE 2.

As shown in FIGURE 1, the proportioning, or ratio, mechanism is enclosed within the housing 50 and its associated cover 53. A slotted aperture 39 in the housing permits transmitting the motion of the error signal linkage to the internal mechanism as will be presently described. The housing rests on base portion 46 which, as will be presently seen, actually encloses a pilot valve and feedback assembly soon to be described. The base is screwed to the instrument frame through bracket members 52. Air connections to the unit are made through the demountable connectors 48 and 49. These connectors are made of more or less flexible plastic material which fit snugly into recesses (FIG. 4) in the unit base 46 and the case wall 10. By suitably proportioning the dimensions of these connecting pieces, it has been found that they require no threading or other sealing, but are flexible enough to be readily forced into their sockets or removed therefrom, and yet have adequate mechanical strength and stiffness to carry fluid under pressure with substantially no leakage.

The cover 53 of the ratio mechanism is inscribed with indicia 55 around its peripheral edge. Juxtaposed to these indicia and mounted on the housing 50 is a fixed index member 44 which serves as a reference point for indicia 55 marking the relative movements of the cover 53 with respect to the fixed housing member 50.

In FIGURES 2, 3, 4 and 5, the control mechanism is illustrated in greater detail. The cap 53 is free to rotate about its axis guided by a recess or rabbet in the rim of housing 50 which mates with the rim of the cover. Internally, the cover is secured by screws 56 to U-shaped bracket 57 (see, in particular, FIGURE 3). This bracket is fixed to the outer end of the central pillar 64, the inner end of which is of reduced diameter and fits snugly in a hole in the bottom of the housing 50 and is adapted for rotation therein. A central hole 72 of capillary dimensions through the pillar member is provided for a fluid passage to the nozzle 65, which forms an outward extension of the pillar member. A flexible gasket 51 prevents leakage of air around the bearing for the inner end portion of the pillar member, while leaving the pillar free to turn. The pillar itself is held in place by a strap 63 which bears an offset hole 109 near its center which is extended in the direction of the center by a slot of somewhat reduced width. On assembly, the hole in the strap fits over the end of the pillar and the slot may then be moved to engage the circumferential recess 64A therein. The strap is then attached to the base by screws 108.

The bracket 57 is formed with a sidewardly extending portion 69 which bears wing portions 114 adapted to provide bearings for shaft pin 70. This pin becomes the axis for movement of the flapper, or obturator plate 68. Near its free end, the flapper provides for an axially placed screw 67 which provides for adjustment, and a locking nut 58. The flattened head 66 of this screw is juxtaposed to the capillary aperture 72 of nozzle 65 and presents a flat, polished surface thereto. The flapper body, or plate 68, is provided with right-angle projections 113 on either side of the plate and juxtaposed to the flapper screw wherein are drilled holes to form the axis of ratio arm 59. This arm 59 is also provided with a pair of bent-over projections, or ears, 110, on opposite sides thereof, and these are drilled to accommodate axis pins which engage with the holes in the corresponding projections, or ears, 113 of the flapper member 68 mentioned above. A further pair of projections 115 on the flapper plate 68 cooperate with projections 114 on bracket plate 69 and are drilled to take the axis pin 70 thereby providing for restricted movement of the flapper screw with respect to the nozzle for purposes yet to be described.

The ratio arm 59 extends across the diameter of the shell 50 and its ends are bent downward and formed in more or less pointed terminations which rest upon the approximately semicircumferential sector plates 60 and 71. The hole 112 in the ratio arm is a clearance hole and with hole 54 in cover 53 allows adjustment of flapper screw 67 from outside the unit.

Figure 3:
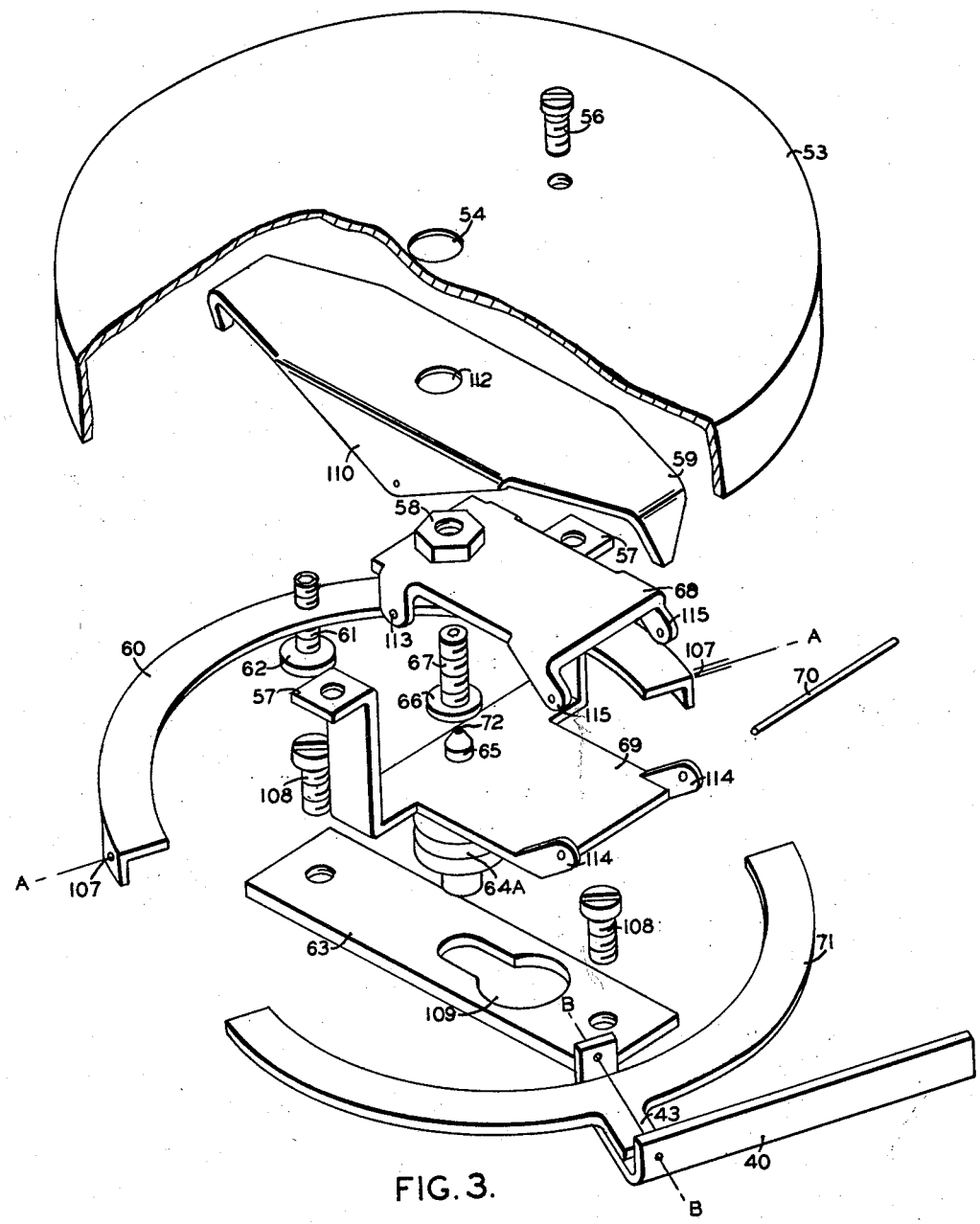
FIGURE 3 is an exploded view of the ratio, or proportional, mechanism.

In the present embodiment of the invention the two sector plates 60 and 71 normally form a substantially continuous circular track. Plate 60, for reasons which will presently be apparent, will be called the "feedback" plate and plate 71 will be called the "deviation" plate. The outer ends of the former are formed with ears, or projections, 107 to provide axis holes which accommodate axis pins engaging juxtaposed holes in the housing wall. The movement of the one plate is therefore a limited rotation about the axis A—A (FIGURE 3). Furthermore, in the center of this plate is a hole drilled and tapped to receive adjustably a screw 61, the head 62 of which is flattened and polished to form a bearing surface for an operating member yet to be described.

The conjugate sector plate 71 the so-called "deviation" plate, is attached at its center to the arm 40 through its right-angle extension 43 and is adapted for limited rotation about the axis B—B (as shown in FIGURE 3). A fixed bracket 41 and axis pin 42 (FIGURES 1 and 2) provide for mounting of the plate 71 in combination with arm 40.

Pilot Valve Assembly

As noted above in connection with FIGURE 1, the base portion 46 of the control unit in the embodiment of the invention being discussed forms an enclosure containing the pilot valve and feedback mechanisms. These will now be described in detail with the help especially of FIGURES 2, 4 and 5 as follows: A recess is formed in the under-side of the base of the housing portion 50 which when covered by flexible diaphragm 81 forms a variable volume chamber 83. Access to this chamber for a supply of pressure fluid is through passage 84, space 73 and passage 78. A screw 82 tapped into a boss on the side of the housing 50 provides a means for connecting test gauges, when desired, to observe pressure conditions within the chamber. Further details of the means for providing the supply pressure will be described hereinafter. Egress for pressure fluid from the chamber 83 is provided by the capillary passage 72 leading to the nozzle 65.

A further flexible diaphragm 79, separated from the first by a spacer member 80 and substantially less in effective area than the first defines a second variable volume chamber 86 in association with a recess in the body member 46. The annular interspace 85 between diaphragms is vented to atmosphere through passage 96. The upper diaphragm normally rests on the upper face of the plug member 100 while the lower diaphragm is clamped to the plug member and moves therewith. The plug member 100 is flange-like and provides a centrally-drilled hole 114 forming a seat for the cone-ended piston 88. The plug is cross-drilled to provide passage 101 for connecting the valve outlet to the atmosphere at port 96. The diaphragms are provided with holes in the clamped portions so disposed that, on assembly, these are aligned to provide unobstructed passage of the fluid supply through passage 78 to space 73.

The body member 50 is joined to the ratio linkage housing through the common plate 45 forming therewith a unitary assembly for the valve and for the linkage mechanisms. The lower variable volume chamber 86, referred to above, is bounded by the diaphragm and plug member and houses the valve piston member 88 and the diaphragm spring 89, both centrally located therein. The spring is designed to exert an upward force on the plug member which is of a predetermined magnitude to oppose pressure exerted on the upper diaphragm, and to position the seating of the plug 100 on the piston 88. The spring bias provides a force which somewhat overbalances the minimum back pressure from the jet, or nozzle 65 when the latter is entirely uncovered by the flapper surface 66 and, in this condition, the output pressure from the valve 88 stands just at zero. The end of the valve piston 88 has a beveled skirt which cooperates with the sharp corner of passage 90 to control the flow of fluid from this passage to the space 86 within the range of effective travel of the piston. The chamber 102 below the piston is connected to the input pressure conduit 49 by cross-drilled hole 103 (see also FIGURE 4). The screw 87 is provided to allow access to internal valve parts for assembly, cleaning, etc.

The input supply of fluid to the upper valve chamber 83 and, thus, to the jet 65, is conducted from the input 49 through hole 103 into space 102, thence through a second cross-drilled hole 74 into the space 75 surrounding a barrel portion of screw plug 97. This screw plug member is also cross-drilled and, furthermore, is drilled axially from the cross-drilled hole outwardly to accommodate a section of capillary tubing 76 which is soldered in place. The chamfered barrel portion 77 of the plug cooperates with a shoulder counter-bored in the valve body to seal the plug and restrict the passage of the pressure fluid from the supply to the very small diameter capillary tubing thus limiting and controlling the flow of fluid into the passage 78 and thereon forwardly into chamber 83.

The lower chamber 86 is in unrestricted communication with the bellows chamber 94 and with the output passage 104 and conduit 48 through the extended interspace 91. (See also FIGS. 4 and 5.)

*Feedback Mechanism*

In chamber 94 the bellows member 92 is responsive to changes in output pressure, as noted above, and its unsupported end is free to move with such changes in an axial direction. The bellows assembly is a unitary structure comprising one or more series-connected pressure capsules terminating in a support fitting 99 which is adapted to be screwed into the cover plate 45. A cut-away view (FIG. 2) shows the internal parts which provide that motions of the recessed end fitting 93 are communicated to a staff member 98 which rests upon the plate 93 and extends axially through the bellows and through the supporting bearing 99, which also provides access for atmospheric pressure to the inside of the bellows, into the linkage housing. Thence, it cooperates with the feedback bearing plate 62 providing for movement of the latter and, through it, the feedback plate 60, in response to output pressure of the pilot valve assembly.

The bellows chamber is provided with an access hole sealed by gasketed screw 95. Also the cover plate 45 of the base body 46 is gasketed by resilient member 47 (see FIGURE 5) whereby the several internal chambers and passages are isolated and the structure is sealed against leakage.

*Principle of Operation, Proportional Action Controller*

Figure 6:
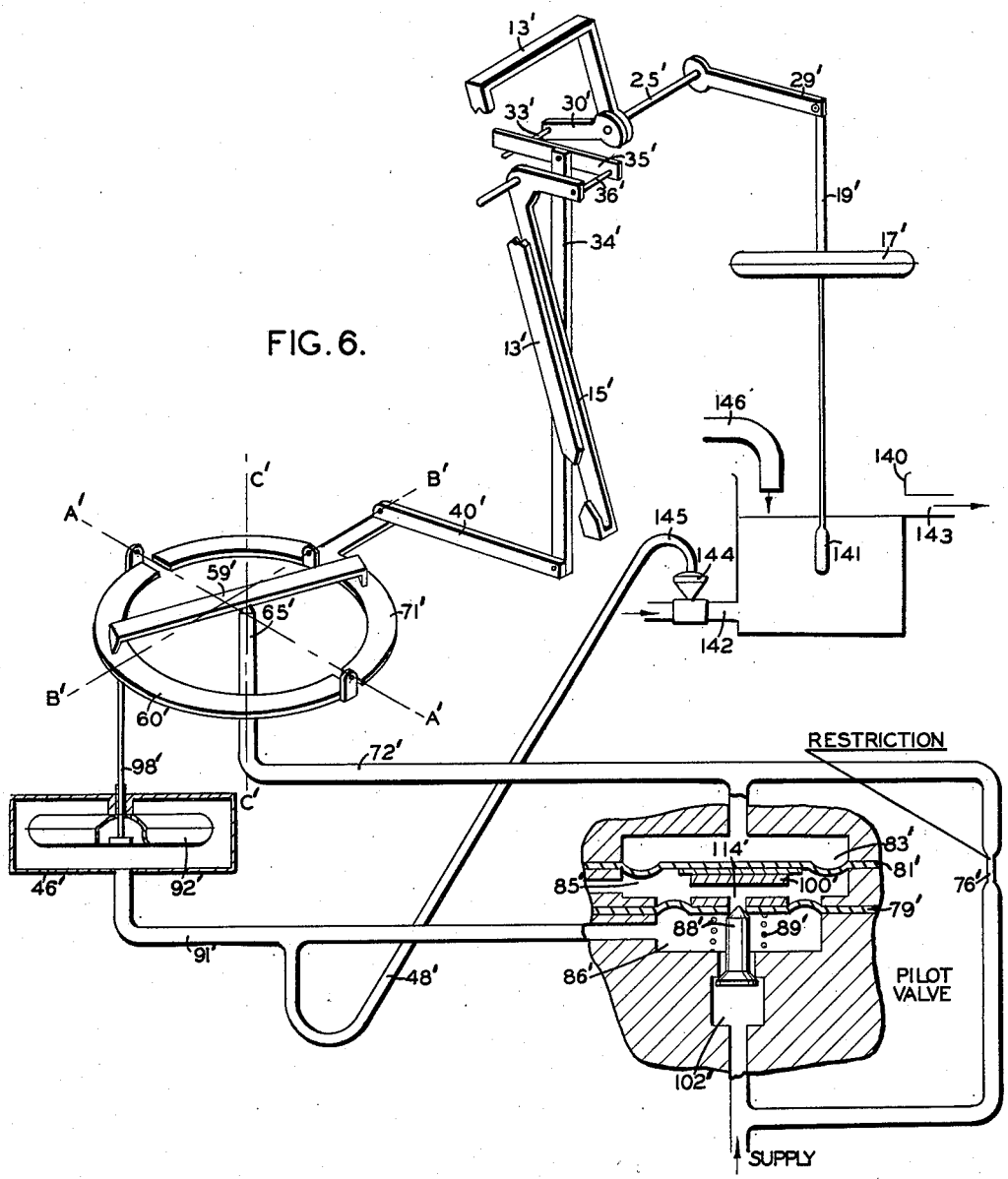
FIGURE 6 is a schematic diagram illustrating the operation of this embodiment of the controller as a proportional action controller.

The operation of the device so far described may be followed with the help of a schematic diagram, FIGURE 6. The correspondence of parts herein with analogous parts in FIGURES 1 to 5 will be recognized by the numbering by which a prime has been added to the original designations.

In the first place, a simple control problem is assumed in which a liquid-filled vat, or tank, 140 is fed through conduit 146 to maintain a constant volume by overflowing at spout 143. A constant temperature in the tank, sensed by the thermometer bulb 141, is provided by admission of a heating medium through conduit 142 under the control of a pressure actuated valve 144 by means now to be described.

By thermometric means well-known in this art, the effect of temperature changes in the tank on bulb 141 is communicated to the resilient-walled pressure capsule 17' the movements of whose end walls are representative of temperature values. The motions are transmitted through linkage members 19' and 29' to cause rotation of the shaft 25' and, through arm 13', displacements of the indicator pointer are made in accordance with the temperature measurement.

The selected value of temperature to which the system is to conform is made to correspond to the position of arm 15' whose center of movement is co-axial with that of indicator arm 13'. It is therefore required that the linkage members be adapted to sense a difference in position of the indicator arm 13' with respect to the preselected position of the control set arm 15'. It may be seen that positioning the set arm 15' also positions in a unique manner the pin 36' which is fixed to one end of arm 35' and forms a pivot for this linkage arm 35'. The other end of arm 35' rests on a pin 33' which is fixed to a branch arm 30' of the indicator member 13' and exactly duplicates the movements of the latter. Now, fixed pivotably to the linkage arm 35' and spaced from its ends is a linkage bar 34'. Thus, by movements of the link 35' caused by differences between the position of pin 33' and pin 36' which are individually representative of the measurement and the control set point respectively, are the deviations transmitted through links 34' and 40' to the ratio mechanism.

In the present embodiment, the ratio mechanism is used to determine the proportional band of control action. In principle this action comprises a relationship well-understood in the art and which, in terms of the present system, can be defined as the ratio of the fluid pressure output to the deviation from the control setting (both expressed in percentage of total variation). The mechanism consists of two approximately semi-circular segments, one of which (71'), responsive to the deviation, is pivoted to rotate about an axis B'—B'; while the other (60'), responsive to a feedback signal to be discussed later, is pivoted for rotation effectively about the common diameter A'—A', perpendicular to axis B'—B'. In sliding frictional contact with both segments is a rigid connecting member 59' rotatable about the vertical axis (C'—C') of the structure and also free to move vertically to conform with the relative positions of its ends resting on the segmental elements 60' and 71'. The fluid nozzle 65' is also disposed along the vertical axis of the structure and the movements of the segmental bars act to change the relative separation of the center of the bar 59' here serving as a "flapper" or obturator member, and the nozzle or jet. within the range of separation actually employed, these movements react upon the fluid pressure as supplied to the nozzle through restriction 76'; these pressure changes being communicated by piping to the pilot valve chamber 83'.

Now, first, observing the action of segment 71' with the homologous segment 60' held fixed, it will be apparent that for a given range of angular rotation of arm 40' and, hence, of the segment 71', the vertical travel of the center point of arm 59' to and from the nozzle 65' will vary depending on the angular position of the arm 59'. When the said arm coincides with the axis of rotation (B'—B') of the segment, the travel is zero for any position of the segment. For any other position on either side of the zero position, the vertical movement of the end of arm 59' is proportional to the movement of its center point. Since, according to the above definition, the proportional band is measured by the ratio of the nozzle opening to the deviation (both referred to their maximum positions), if the dimensions are given the radial position of arm 59' can, theoretically, be calibrated directly in values of percent proportional band (Note, for example, scale markings 55 in FIGURE 1). The values of proportional band decrease to zero at the axis of rotation of the segment and increase in an exponential manner as the rtio angle is increased toward the 90° position. The values are symmetrical on either side of zero angle but the control action is reversed from one side to the other, that is, on one side the nozzle gap, and thus, the output pressure increases with increasing deviation (called, by general acceptance, "direct action") and on the other side, the gap and corresponding output pressure decreases with increasing deviation (called "reverse action").

As already noted, the pressure changes in duct 72' due to more or less exposure of the nozzle, are reflected into chamber 83' of the pilot valve, the supply to the nozzle being controled by restriction 76' in quantity and constancy. These pressure values are amplified by the ratio of areas of the double diaphragms 81' and 79' and normally urge the exhaust port 114' into flow restricting relation with piston 88'. Recognizing that the range of effectiveness of the nozzle-flapper combination extends over a fluid pressure range usually very small and involves a minimum pressure value generally not zero, a biasing spring 89' is provided applying an arbitrary value of force to the valve diaphragm system for the purpose of initiating valve action only after the aforementioned minimum input pressure has been reached. Initially, the supply pressure in chamber 102' holds the valve piston 88' in a position to cut off the supply from chamber 86' and, thus, from the output. At the reference point determined by the input pressure in chamber 83' opposed by the fixed bias of spring 89', the port 114' engages the piston 88' and cuts off the atmospheric chamber 85' and, upon further increase in said input pressure, the passage to the output chamber 86' is opened by downward movement of said piston, thus establishing a pressure in the output conduit 145 which passes to the diaphragm-operated control valve 144. It passes also to the chamber 46' and to the pressure capsule 92', the deflection of which provides a "feed back" motion proportional to the output pressure to the proportioning linkage.

We have so far assumed a fixed position for the "feed back" segment 60' and thus that the effective range for relative movement of the flapper with respect to the nozzle was considerable. In principle it is well-understood that this is not the fact and that the effective range of nozzle-flapper separation is only of the order of thousandths of an inch. It is therefore necessary to apply "feed back" according to well-known principles whereby the effective working range of the nozzle and flapper is greatly increased.

Thus for wide ranges of proportional control action, stability and sensitivity of the system may be improved by "feeding back" a signal from the output in opposition to the input and reaching a dynamic equilibrium between input and output for minimum increments of the sensing mechanism. According to the present invention, for each output pressure the pressure capsule positions the sector plate 60' in a direction opposite to the direction of vertical movement of the homologous sector plate 71'. The amount of movement depends on the position of arm 59', which has already been established as noted above, in setting the desired proportional band value and is approximately equal to the initial movement of sector 71'. The effective difference in deflection of the two sector plates is the actual measure of the output pressure and this later acts on valve 144 to determine the flow of the controlling medium through this valve into the tank 140. The control loop for the illustrative process is thereby seen to be closed in accordance with well-known principles.

It is seen that the cover 53 of the housing 50 of the ratio mechanism is attached to the ratio arm 59, and may therefore be used to move the ratio arm for manual adjustment of ratio or proportional band. The indicial marks 55 around the rim of the cover may, in association with the fixed index 44, provide convenient means for setting the proportional action at predetermined values. The range of adjustment comprises two quadrants of motion of the cover, one for "direct" and the other "reverse" control action. Each of the two working quadrants is symmetrical about a point which corresponds to no motion of the ratio arm 59 by the sector member 71 with input deviations, and on either side of that point values decrease as shown to zero (corresponding to the maximum motion of the ratio arm 59 by sector 71 with input deviation).

Reset Action Controller

Figure 7:
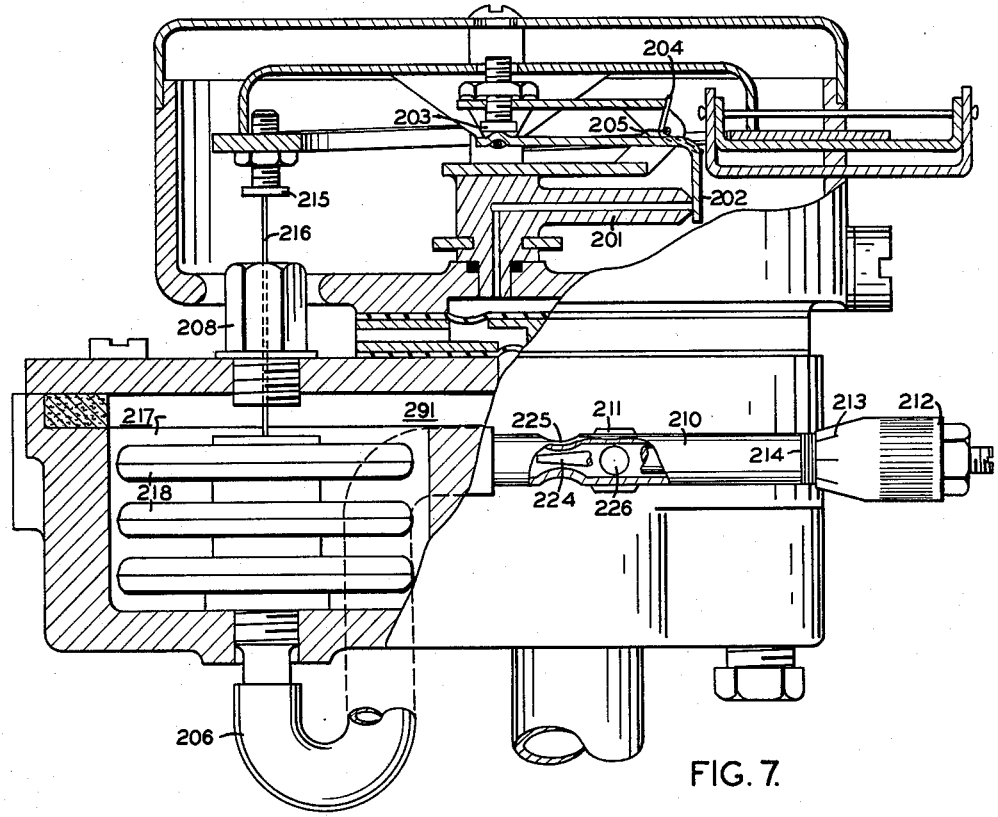
FIGURE 7 illustrates the modifications of the control unit for adding reset control action to the above embodiment.

In the accepted nomenclature of the art, reset control action (also known as "integral" control action) is a type of control in which the corrective action changes at a rate proportional to the deviation. Provision is readily made to adapt the controller unit of my invention to this combination type of control action as may be seen by reference to FIGURES 7 and 8.

The essential changes necessary over the proportional controller hereinbefore described are accomplished in the ratio and feedback mechanisms as shown in these figures. Herein, as a matter of convenience, the action of the ratio linkage is reversed from that shown in FIGURE 2. Thus, the nozzle member 201 becomes the counterpart of nozzle 65 in FIGURE 2 but is turned 90° from the vertical axis. The flapper member 202 is formed in a right angle of which one leg is in juxta-position to the nozzle aperture and the other rests against the anvil 203, the counterpart of which, in the previously described model served as flapper 66. This L-shaped member is pivoted for movement about the common shaft 205 and a small torsion spring 204 encircling this shaft is arranged to exert a biasing force to keep the flapper arm tending toward contact with the anvil 203. With the exceptions thus noted, the components and essential operations of the ratio mechanism are unchanged. The assembly of the mechanism is shown in somewhat greater detail in the exploded view of FIGURE 8.

Figure 2:
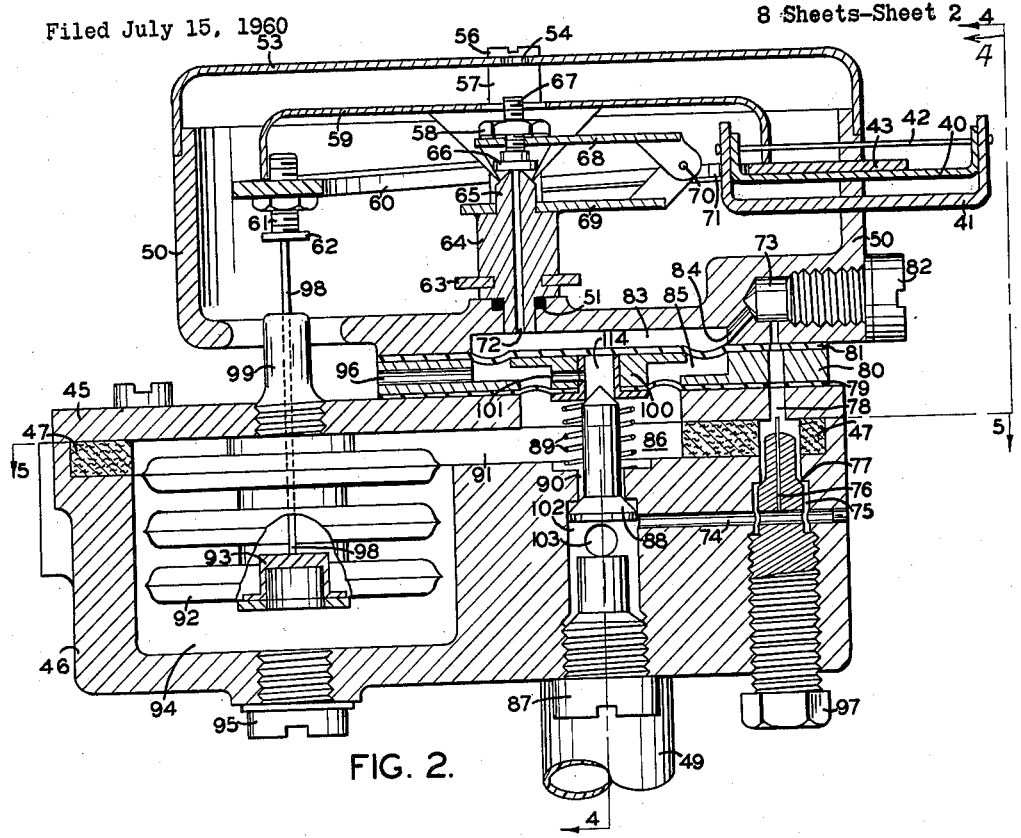
FIGURE 2 is a vertical cross sectional view of the proportional control mechanism.
Figure 5:
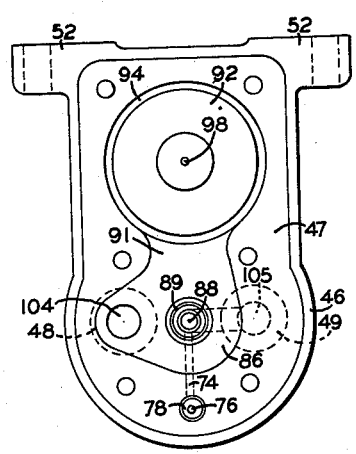
FIGURE 5 is a horizontal cross sectional view of the control unit as indicated by the lines 5—5 in FIGURE 2 showing the pilot valve and feedback mechanism.

The reset follow-up is provided by reversing the bellows member 92 in FIGURE 2, replacing it for the screw plug 95 in the wall of chamber 94 as found in the proportional controller. The motion of the free-end of the new bellows 218 is now transmitted by the staff member 216 through pressure tight stuffing gland 208 and, as before, this staff bears against the follow-up anvil plate 215.

Pressure is conveyed to the inside of the bellows 218 through conduit 206 from a needle valve 210 by which small flows of fluid can be precisely controlled. A conduit 211 leads from the output chamber 291 of the pilot valve assembly to the body of this needle valve. The valve stem 224 is a long, tapered member, threaded at one end, which acts in cooperation with a restricted section, or throat, 225 to control flow. The position of the stem may be precisely set by the knurled head 212 which bears indicia 213 which cooperate with fixed indical rings 214 on the barrel of the valve to identify in the manner of a micrometer vernier the position of the multi-turn valve stem.

The modified proportional action of this combination of elements to accomplish proportional plus reset action may be better understood from the diagram of FIGURE 9 wherein, as may be seen, are presented merely the modifications of the analogous diagram of FIGURE 6. The primed numbers indicate the correspondence with parts shown in the preceding drawings.

Proportional response to a deviation is accomplished in the same way as hereinbefore described except that, for convenience, as mentioned above, the directions of the motions of the ratio and feedback members is reversed. Thus, the ratio arm 59′ provides direct-action and reverse action on opposite sides of the axis of movement from those used in proportional control as described above. Likewise, the feed-back effect on the arm 60′, as derived from bellows 218′, is opposite in direction from the proportional case. The reversal of the action of flapper and nozzle is accomplished by turning the nozzle 90° from the vertical axis and interposing between the ratio arm 59′ and the nozzle an L-shaped arm pivoted near the angle whereby the operative relation between flapper and nozzle is reversed from the preceding case. The action of the pilot valve is unchanged. The output thereof is fed to the control device (for example, the valve 144 of FIGURE 6) through the output conduit 48′ and through two auxiliary passages 291′ and 211′ to (a) the chamber 217′ whereby in the sealed chamber, the output pressure is maintained on the exterior of the feedback bellows 218′; and (b) to the interior of the feedback bellows 218′ enclosed within the sealed chamber 217′, through a manually adjustable needle valve 210′ by which a predetermined value of time delay may be set to affect the output.

In operation, the feedback effect on the feedback arm 60′ is the resultant of two pressure effects, both derived from the output pressure, acting on the bellows member 218′. The first pressure acts on the exterior of the bellows and is equal in magnitude to the output pressure and immediate in effect. The first response is therefore that of the proportional controller as hereinbefore described. A second pressure is developed across the needle valve 210′ and acts on the interior of the element 218′. This pressure drop may be in either direction according to the direction of the deviation from the control point and always tends toward equalization at a rate depending on the setting of the needle valve. At equalization, the feedback bellows has always returned to the same position and, thus, also the feedback segment plate takes a fixed position whereby the flapper is positioned with respect to the nozzle so that the process continues in unbalance until the process variable and the control setting reduce the input deviation to zero. In other words, following a deviation, the reset controller continues to change its output pressure until the final control element (the valve 144 of FIGURE 6, for example) is repositioned so as to bring the controlled variable back to the set point. It is a characteristic of reset controller that it cannot come to balance until this condition is reached and, thus, this action eliminates offset or "droop" errors inherent in simple proportional control.

Rate, or Derivative Action Controller

It is the essential characteristic of rate action in a controller that a pressure component must be added to the output pressure which is proportional to the rate of change of the deviation. It is ordinarily combined with simple proportional control action as hereinbefore described and, in fact, in order to enhance the stability of a control system, it is desirable to provide for an initial immediate proportional response diminished in magnitude to a small fraction of the normal proportional response.

Figure 10:
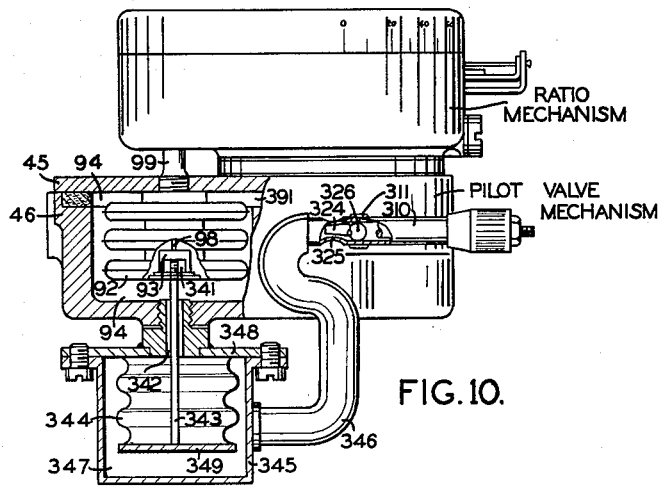
FIGURE 10 is an elevation of the control unit according to the invention, partly cut away, to show modifications providing for the addition of derivative, or rate, control action to the basic proportional controller.

Since, in practice, the essential modification over the hereinbefore detailed proportional controller lies in the feedback bellows system and the output pressure connection thereto, these elements have been shown in FIGURE 10 and, schematically, in FIGURE 11.

In connection with the former, the "ratio mechanism" designates the corresponding mechanism unchanged from FIGURES 2 and 6 of the foregoing description. Similarly the "pilot valve mechanism" corresponds exactly to the valve of FIGURES 2 and 6, except that, as in the reset case shown in FIGURES 7 and 9, a connection has been made directly to the output chamber 91 for the needle valve inlet 211. Further correspondence with the proportional mechanism may be seen by the identity of numbering in the feedback chamber 94 wherein the bellows 92 screws into the cover plate 45 through the end fitting 99 which is internally drilled to form a more or less pressure tight sliding bearing for the staff member 98 but allowing access of atmospheric pressure to the inside of the bellows. The staff 98 rests on the lower recessed end fitting 93 for the bellows and moves therewith to transmit motion through the above staff member to the feedback portion of the ratio mechanism as hereinbefore described.

Now, added to this is a second chamber consisting of a shell 345 secured to a base fitting 348. The latter includes a screw fitting which is adapted to screw into the base of the housing 46 and is drilled to form a clearance hole for shaft 343. The upper end of this shaft is secured rigidly to end fitting 93 of the proportional bellows 92 and the lower end is fixed to end plate 349 of rate bellows 344, providing thereby a rigid connection between the two bellows. The lower bellows is sealed to the base plate and the passage 342 through the connector member provides access to the feedback bellows chamber 94. The shell 345 enclosing the rate bellows 344 is connected by a duct 346 to the outlet of needle valve 310 which permits manual adjustment of the fluid pressure derived from the pilot valve output in the same manner as has been described for the reset controller.

In operation, assuming a rapidly varying deviation, the pilot valve output pressure (refer in particular to the diagram of FIGURE 11), indicated in the various branches of conduit 48′, including passage 391′, is immediately reflected in chamber 94′ and, through the intercommunicating passage 342′, also within bellows member 344′. The ratio of effective areas of the bellows 344′ and the further bellows 92′ to which it is rigidly attached through connecting link 343′ is chosen such that, though the initial effect is to compress bellows 92′, the concurrent effect of the expansion of bellows 344′ is to cancel most, but not all, of the effect of the first deflection. This then causes an immediate proportional response transmitted by staff 98′ to the feedback portion 60′ of the ratio mechanism. This slight allowance of immediate proportional response has been found useful in practice in stabilizing control action. Meanwhile, the output pressure from passage 391′ is also supplied to the input 311′ of needle valve 310′ which is set at a predetermined opening to allow fluid to bleed at a controlled rate through passage 346′ into chamber 347′. The effect of this is that pressure in chamber 347′ builds up at a rate determined by the needle valve setting and, ultimately, equals the pressure within the bellows, that is the controller output pressure. The overall effect is therefore for an initial deviation to be delayed in its full effect on the feedback elements and thus in counteracting the flapper movement produced by the measuring system as shown in connection with the previously described proportional action device.

Alternate Ratio Mechanism

Figure 12:
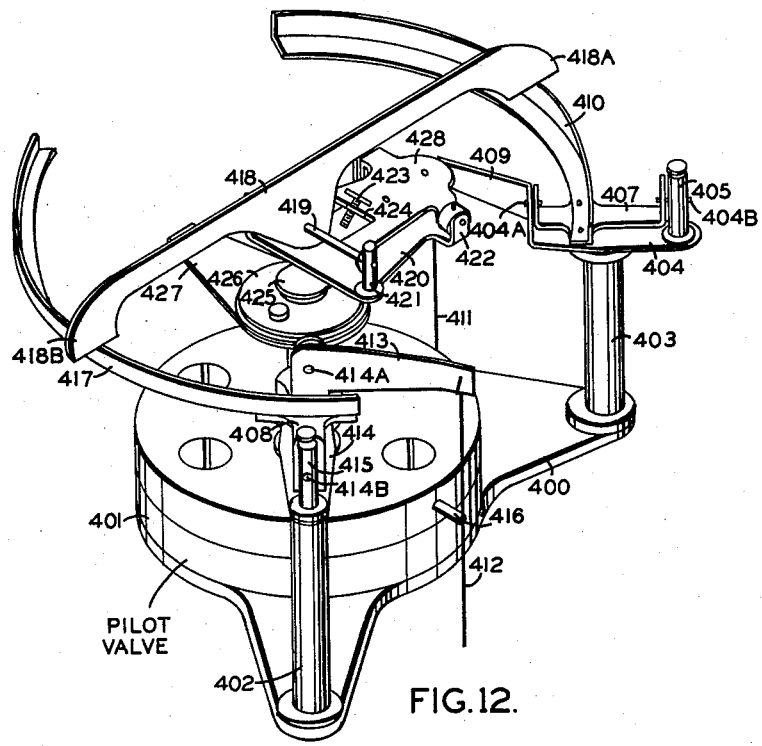
FIGURE 12 is a perspective view of a generalized ratio mechanism, of which the proportional control unit hereinbefore illustrated can be considered a particular embodiment.
Figure 13:
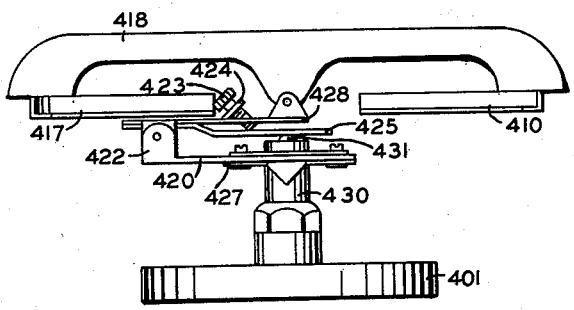
FIGURE 13 is a side elevation of the ratio mechanism of FIGURE 12 including the nozzle and flapper.

An alternate form of the ratio mechanism of the preceding embodiments may be seen in FIGURES 12 and 13. Here are shown two independent juxtaposed segmental bars, or tracks, 410 and 417, bridged by a ratio arm member 418, the free ends of which rest on the track members. The arm itself is pivoted for movement about the axis which is also the axis of symmetry of the segmental track members and is further pivoted for movement about a diameter of the track structure.

The track members are supported from pillars 403 and 402 fixed to mounting plate 400. Each pillar carries a frame 404 and 414 which provides pivots, 404A and 404B or 414A and 414B, for the track mounting bracket 407 and 408 respectively. These brackets are fixed to the track members at points thereon such that the axes of movement of the tracks pass through the common vertical axis of symmetry of the structure though said axes may not necessarily lie in the same horizontal plane. The bracket members 407 and 408 include extended portions forming linkage arms 409 and 413, near the ends of which are pivotably attached wire links 411 and 412 for transmitting motion to and from external measuring transducers (not shown). The track members themselves are in the form of circular channels for stiffness and each presents a narrow edge on which the ratio arm rests near the ends thereof.

This ratio arm has at its ends blade portions 418A and 418B which slideably engage the respective tracks, the blades being of appreciable width in order to adapt the points of contact to the changes in radial distance involved in the kinematic relationships of the several elements of the linkage system. The ratio arm is fixed to a diametrical shaft 419 at its center which, in fact, also coincides with the vertical axis of the system. Shaft 419 is pivoted at its ends in bearings in posts 421 whereby a limited rotation of the ratio arm is permitted in a vertical plane centered in the axis of the structure and in accordance with the positions of the track members 410 and 417.

The control unit consists of the flapper-controlled pilot valve 401 mounted on the base plate 400, the operative details of which may be considered, for example, identical with the corresponding apparatus of the preceding embodiments of my invention. The nozzle 430 of this valve is axially aligned along the vertical axis of symmetry of the structure with the aperture 431 in the outer end thereof. Journaled for free rotation about the nozzle member is a supporting plate 420, to which is joined an arm extension 427 for transmission of movements thereto and therefrom. A radially extending portion of said plate is provided with bent-up tabs 422 forming pivot bearings for upper mounting plate 428 which also carries bent-up tabs forming pivot bearings juxtaposed to and engaging with the first bearings. This latter bearing plate 428 also bears pivot posts 421 forming pivots for the ratio arm shaft 419. Furthermore on the underside of this plate 428 is fastened a strip of resilient metal forming the flapper, or obturator, 425 which cooperates with the nozzle orifice 431 to effect control action as has already been described. A threaded tab 424 formed in the upper bearing plate 428 accommodates the thumb-screw 423 which, at its outer end, presses adjustably against flapper plate 425 providing thereby for initial adjustment of the relative position of flapper with respect to nozzle opening. Fluid pressure is assumed supplied to the pilot valve 401 at input means not shown; the output is connected at conduit 416 for control purposes.

The operation of this device as a ratio-establishing means is clear from the discussion of previous embodiments. The present rather generalized form of the invention, however, illustrates the adaptability of the device to other uses than the process control applications hereinbefore considered. It will be recognized that the mechanism provides variable ratio of input motion to the nozzle-flapper opening. With the compensatory feed-back motion causing motion of one of the segments in an opposite sense to motion of the input segment, this will provide an output pressure from the pilot valve proportional to the original input and in a predetermined ratio thereto. This ratio may be set by manually turning the arm 427, and thereby the plate 420 and ratio arm 418, as in the foregoing examples of its use, or the ratio may be automatically set by providing for movement of the arm 427 by a suitable transducing element (such as a pressure responsive bellows) under control of some outside source. A suitable scale (not shown) may be provided for cooperation with a reference point on said arm 427 as an aid to manual setting of the ratio.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Pneumatic apparatus for controlling a variable condition, said apparatus comprising means including a member having an intermediate portion thereof movable to vary the magnitude of a fluid pressure, means including a first trackway pivotally mounted about a given axis and engaging a portion of said member on one side of said intermediate portion for supporting said member, means including a second trackway pivotally mounted about a different axis and engaging another portion of said member on the opposite side of said intermediate portion for supporting said member, means responsive to a variable condition for moving the first trackway to operate said member, means responsive to another variable condition for moving the second trackway to operate said member, and means for varying the ratio between the extent of operation of said supporting means and the extent of operation imparted thereby to said member.

2. Pneumatic apparatus for controlling a variable condition, said apparatus comprising means including a member having an intermediate portion thereof movable to vary the magnitude of a fluid pressure, a trackway pivotally mounted about a given axis and engaging a portion of said member on one side of said intermediate portion to support said member, a trackway pivotally mounted about a different axis and engaging another portion of said member on the opposite side of said intermediate portion to support said member, means responsive to different variable conditions for actuating the respective trackways, and means for shifting said member to different positions along said trackways.

3. Pneumatic apparatus for controlling a variable condition, said apparatus comprising means including a member having an intermediate portion thereof movable to vary the magnitude of a fluid pressure, a substantially semicircular trackway pivotally mounted about a given axis and engaging a portion of said member on one side of said intermediate portion to support said member, a substantially semicircular trackway pivotally mounted about a different axis extending substantially coplanar with said given axis and engaging another portion of said member on the opposite side of said intermediate portion to support said member, means responsive to different variable conditions for actuating the respective trackways, and means for turning said member about an axis at an angle to each of the aforementioned axes for shifting said member to different positions along said trackways.

4. Pneumatic apparatus for controlling a variable condition, said apparatus comprising means including a member having an intermediate portion thereof movable to vary the magnitude of a fluid pressure, means including a first trackway pivotally mounted about a given axis and engaging a portion of said member on one side of said intermediate portion for supporting said member, means including a second trackway pivotally mounted about a different axis and engaging another portion of said member on the opposite side of said intermediate portion for supporting said member, means responsive to the deviation of a variable from a set value for moving the first trackway to operate said member to vary said fluid pressure, means responsive to variation in said fluid pressure by said member for moving the second trackway to operate said member to modify said fluid pressure variation, and means for varying the ratio between the extent of operation of said supporting means and the resulting extent of operation of said member.

5. Pneumatic apparatus for controlling a variable condition, said apparatus comprising means including a member having an intermediate portion thereof movable to vary the magnitude of a fluid pressure, a trackway pivotally mounted about a given axis and engaging a portion of said member on one side of said intermediate portion to support said member, a trackway pivotally mounted about a different axis and engaging another portion of said member on the opposite side of said intermediate portion to support said member, means responsive to the deviation of a variable from a set value for actuating the first trackway to operate said member for varying said fluid pressure, means responsive to variation of said fluid pressure by said member for actuating the second trackway to operate said member for modifying said fluid pressure variation, and means for shifting said member to different positions along said trackways to vary the extent of operation of said member by said trackways.

6. Pneumatic apparatus for controlling a variable condition, said apparatus comprising means including a member having an intermediate portion thereof movable to vary the magnitude of a fluid pressure, a trackway pivotally mounted about a given axis and engaging a portion of said member on one side of said intermediate portion, a trackway pivotally mounted about an axis at substantially right angles to the first mentioned axis and engaging another portion of said member on the opposite side of said intermediate portion, means responsive to different variable conditions for actuating the respective trackways, and means for turning said member about an axis at substantially right angles to each of the aforementioned axes for shifting said member to different positions along said trackways.

7. Pneumatic apparatus for controlling a variable condition, said apparatus comprising a fluid pressure conduit having an outlet, a member having an intermediate portion thereof movable to obstruct said outlet to varying extents to vary the magnitude of fluid pressure therein, a pilot valve controlling a supply of fluid pressure to regulate the value of said condition, means responsive to fluid pressure in said conduit to control the position of said pilot valve, trackways movable about different substantially coplanar axes and engaging different portions of said movable member spaced on opposite sides of said intermediate portion, means responsive to deviation of said variable condition from a set value for actuating one of said trackways to operate the movable member and thereby vary the fluid pressure in said conduit, and feedback means responsive to fluid pressure controlled by said pilot valve for actuating the other of said trackways to operate said movable member to produce an effect on the fluid pressure in said conduit in opposition to the effect of said deviation responsive means.

8. Pneumatic apparatus for controlling a variable condition, said apparatus comprising a housing structure, a nozzle in said housing structure, passage means in said housing structure for conducting fluid under pressure to said nozzle, a flapper movable adjacent said nozzle to vary the pressure of fluid therein, means responsive to a variable condition for moving said flapper to vary said fluid presure, a pilot valve in said housing structure controlling a supply of fluid under pressure to regulate the value of said condition, means responsive to fluid pressure in said nozzle for operating said pilot valve, a fluid pressure chamber in said housing structure for receiving fluid pressure under control of said pilot valve, a bellows in said chamber responsive to fluid pressure therein, means actuated by said bellows for actuating said flapper to vary the pressure in said nozzle, said housing structure having an opening communicating with said fluid chamber, means in said opening having a passageway formed therethrough and supporting a second fluid pressure chamber having a bellows therein, means extending from the second mentioned bellows through said passageway for acting upon the first mentioned bellows and means comprising a restricted passageway for conducting fluid from said pilot valve to said second chamber.

9. Pneumatic apparatus for controlling a variable condition, said apparatus comprising a unitary housing structure including a fluid pressure conduit having an outlet, a member movable in said structure to obstruct said outlet to varying extents to vary the magnitude of fluid pressure therein, a pilot valve in said structure controlling a supply of fluid under pressure to regulate the value of said condition, a fluid pressure chamber in said structure for receiving fluid under pressure under control of said pilot valve, means in said structure responsive to fluid pressure in said conduit to control the position of said pilot valve and thereby the magnitude of fluid pressure supplied to said chamber, means responsive to deviation of said variable condition from a set value for actuating said movable member and thereby varying the fluid pressure in said conduit, a bellows in said chamber responsive to fluid pressure supplied thereto by said pilot valve, means controlled by said bellows for operating said member to produce an effect on the pressure in said conduit opposite to that of said deviation responsive means, means in an opening in a wall of said chamber having a passage formed therethrough, and means connected with said passage for imparting a reset action to said bellows.

10. Pneumatic apparatus for controlling a variable condition, said apparatus comprising a unitary housing structure including a fluid pressure conduit having an outlet, a member movable in said structure to obstruct said outlet to varying extents to vary the magnitude of fluid pressure therein, a pilot valve in said structure controlling a supply of fluid under pressure to regulate the value of said condition, a fluid pressure chamber in said structure for receiving fluid under pressure under control of said pilot valve, means in said structure responsive to fluid pressure in said conduit to control the position of said pilot valve and thereby the magnitude of fluid pressure supplied to said chamber, means responsive to deviation of said variable condition from a set value for actuating said movable member and thereby varying the fluid pressure in said conduit, a bellows in said chamber responsive to fluid pressure supplied thereto by said pilot valve, means controlled by said bellows for operating said member to produce an effect on the pressure in said conduit opposite to that of said deviation responsive means, means in an opening in a wall of said chamber having a passage formed therethrough, and means connected with said member for imparting to said bellows an effect proportional to the rate of change of said deviation.

11. Pneumatic apparatus for controlling a variable condition, said apparatus comprising a housing structure, a nozzle in said housing structure, passage means in said housing structure for conducting fluid under pressure to said nozzle, a flapper movably supported in said housing structure with an intermediate portion thereof adjacent to said nozzle to vary the pressure of fluid therein, a first substantially semicircular trackway engaging and supporting said flapper on one side of said intermediate portion, said first trackway being pivotally mounted on said housing structure about a first axis, means responsive to a variable condition for shifting said first trackway about said first axis, a pilot valve in said housing structure controlling a supply of fluid under pressure to regulate the value of said condition, means responsive to fluid pressure in said nozzle for operating said pilot valve, said housing structure having a fluid pressure chamber formed therein for receiving fluid pressure under control of said pilot valve, a bellows in said chamber responsive to fluid pressure therein, a second substantially semicircular trackway pivotally mounted in said housing structure about a second axis substantially coplanar with said first axis, means connecting said second trackway to said bellows, said second trackway engaging and supporting said flapper on the other side of said intermediate portion thereof, and means for shifting said flapper to different positions along said trackways.

12. Apparatus as defined by claim 11, wherein there is provided an opening in said housing structure communicating with said chamber, means in said opening having a passageway formed therethrough, means connected to said means positioned in said opening and forming a unitary assembly with said housing structure and defining a second fluid chamber, a second bellows mounted in said second chamber, means extending from said second bellows through said passageway for acting upon the first mentioned bellows, and means comprising a restricted passageway for conducting fluid from said pilot valve to said second chamber.

13. Pneumatic apparatus for controlling a variable condition, comprising a housing structure including a base, means connected to said base forming a pilot valve and with said base defining a variable volume chamber, a nozzle in said housing structure connected to said base, means responsive to fluid pressure in said nozzle for operating said pilot valve, passage means in said base for conducting a restricted flow of fluid under pressure from a supply thereof to said nozzle, a flapper movable adjacent to said nozzle to vary the pressure of fluid therein, means responsive to a variable condition for moving said flapper to vary said fluid pressure, means in said base controlled by said pilot valve for connecting said variable volume chamber to a supply of fluid under pressure, means for connecting said variable volume chamber to a condition controller, said base having a fluid pressure chamber formed therein and providing substantially unrestricted direct communication between said variable volume chamber and said fluid pressure chamber, a bellows in said fluid pressure chamber responsive to fluid pressure therein, and means actuated by said bellows for actuating said flapper to vary the pressure in said nozzle.

14. Pneumatic apparatus for controlling a variable condition, comprising a housing structure including a base, means connected to said base forming a pilot valve and with said base defining a variable volume chamber, a nozzle in said housing structure connected to said base, means responsive to fluid pressure in said nozzle for operating said pilot valve, passage means in said base for conducting a restricted flow of fluid under pressure from a supply thereof to said nozzle, a flapper having an intermediate portion thereof movable adjacent to said nozzle to vary the pressure of fluid therein, means responsive to a variable condition including a semicircular trackway engaging said flapper on one side of said nozzle for moving said flapper to vary said fluid pressure in said nozzle, means in said base controlled by said pilot valve for connecting said variable volume chamber to a supply of fluid under pressure, means for connecting said variable volume chamber to a condition controller, said base having a fluid pressure chamber formed therein and providing substantially unrestricted direct communication between said variable volume chamber and said fluid pressure chamber, a bellows in said chamber responsive to fluid pressure therein, and means actuated by said bellows including a second semicircular trackway supported on said base and engaging said flapper on the other side of said nozzle for actuating said flapper to vary the pressure in said nozzle.

References Cited in the file of this patent
UNITED STATES PATENTS

| | | |
|---|---|---|
| 2,585,347 | Robins | Feb. 12, 1952 |
| 2,742,917 | Bowditch | Apr. 24, 1956 |
| 2,829,663 | Freeman et al. | Apr. 8, 1958 |